Jan. 12, 1954     G. L. SAUNDERS     2,665,434
MEANS FOR MOUNTING BLADES ON HAND IMPLEMENTS
Filed Aug. 28, 1950
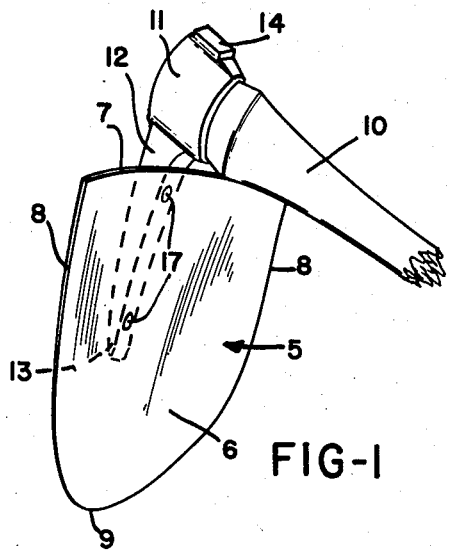
FIG-1
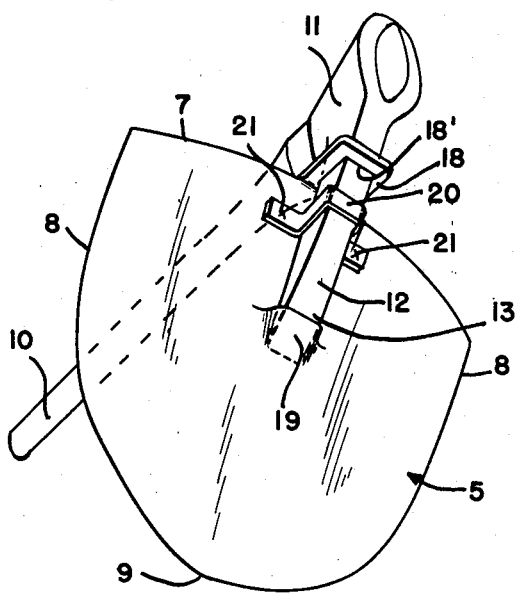
FIG-3
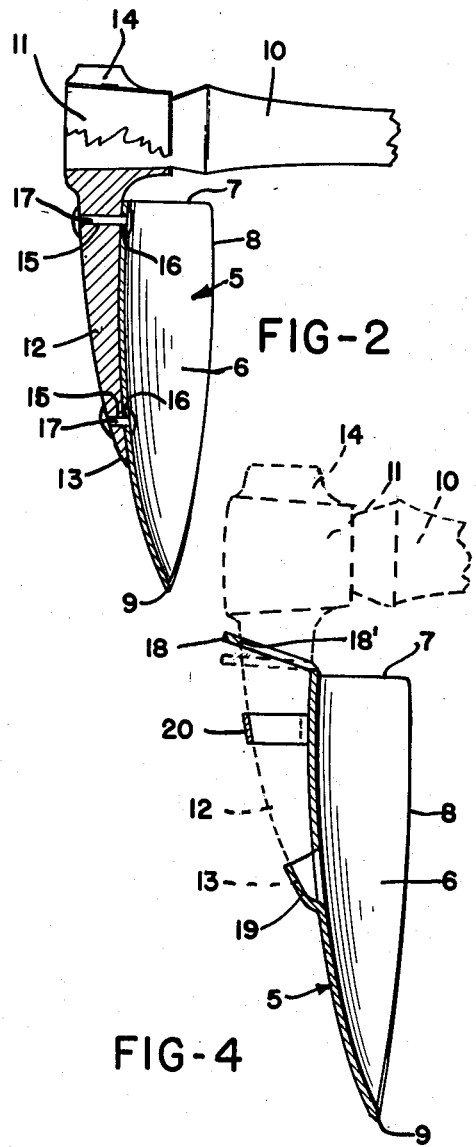
FIG-2
FIG-4
Inventor
GEORGE L. SAUNDERS
By
*Glenn L. Fish*
Attorney Patented Jan. 12, 1954

2,665,434

UNITED STATES PATENT OFFICE 2,665,434

MEANS FOR MOUNTING BLADES ON HAND IMPLEMENTS

George L. Saunders, Kennewick, Wash.

Application August 28, 1950, Serial No. 181,772

1 Claim. (Cl. 7—1)

My present invention relates to hand implements, especially adapted for earth tilling, and more particularly to means of securing implements to their handles.

One object of the invention lies in the provision of a spade-like implement on a handle disposed at right angles thereto.

Another object of the invention lies in the provision of a handy and useful tool from parts of a spade and a pick which may render the parts usable after the tools have lost their original utility by reason of breaking a handle or a segment of the tool.

Another object of the invention is to provide means of securing the spade-like implement to one bit of a pick.

Another object of the invention lies in the provision of a hand implement which is inexpensive to make and very useful for many purposes.

Other objects and advantages will be apparent during the course of the following description.

In the drawings, forming a part of this specification, like numerals are employed to designate like parts wherein, Figure 1 is a view in perspective of my improved hand implement, Figure 2 is a view of the implement shown in Figure 1, partially in elevation and partially in cross section, Figure 3 is a view in perspective of a modification of the invention, and, Figure 4 is a vertical cross section of the spade-like body shown in Figure 3 and having the balance of the invention shown in dotted lines.

The invention comprises a spade-like implement having a body 5 which is formed of sheet metal and substantially concavo-convex in appearance with the concave side being the face as at 6. The body appears somewhat heart-shaped when viewed in elevation but is supplied with a straight top edge 7. The side edges 8, 8 are disposed at right angles to the top edge 7 and extend downwardly in an arc until they merge in a rounded point 9 at the bottom center of the body. The rounded point 9 and portions of the side edges adjacent the point are sharpened as a hoe edge to facilitate cutting sod and earth when so used.

The spade-like portion 5 is secured to the pick-like implement having a handle 10 which is mounted in a tapered sleeve 11. The sleeve 11 is formed with an integral bit 12 substantially rectangular in cross section which tapers toward its free end and terminates in a chisel point 13. The bit 12 is curved longitudinally and thus conforms to the convex contour of the back of implement body 5.

On the opposed side of sleeve 11 and diametrically across said sleeve, I have provided a flat faced boss 14, which serves as a hammer for breaking rock and the like.

The form of the invention exemplified in Figures 1 and 2 shows the bit 12 provided with spaced transverse bores 15 and the implement body 5 is bored at 16 to register with the bores 15 of the bit. Rivets 17 are passed through the bores 15, 15 and 16, 16 and secured to mount the body 5 on the bit 12 with its point 9 disposed downwardly.

A modified means of securing implement body 5 to bit 12 is shown in Figures 2 and 3 of the drawing wherein the body 5 is provided with a concavo-convex shape and a face 6, top edge 7 and side edges 8 which arc downwardly and merge into the point 9. The modification lies in the provision of a central spring lip 18 on the top edge, midway the length thereof and is formed with an opening 18' rectangular in plan to conform to the transverse cross section of bit 12. An integral socket 19 is pressed from the body 5 of the spade-like portion substantially centric thereof. A retainer band 20 is welded at 21 to the back of body 5 and is looped to receive bit 12.

To mount the body 5 on the bit 12, it is merely necessary to insert bit 12 with the chisel point 13 leading, through the opening 18' of lip 18, move it downwardly through looped band 20 and seat the chisel point 13 firmly in socket 19. This will cause spring lip 18 to be flexed downwardly, and the resilient action to return will cause the inside edge of opening 18' to bind the rear edge face of bit 12 and prohibit its upward movement out of socket 19. Any upward pull on bit 12 will serve to more tightly bind bit 12 in the opening 18' and thus securely lock the body 5 and bit 12 together.

When it is desired to remove the body from the bit, it is merely necessary to use a hammer and tap lip 18 downwardly which releases the binding engagement between said lip and bit 12.

The invention has been found very useful in digging ditches, stripping moss from the surface of the ground, cutting sod, plumbing dirt walls of excavations, back-filling ditches and holes and multiple other uses too numerous to mention.

Having thus described my invention, I claim:

Means for mounting a spaced body to a tool having a bit comprising a socket pressed rearwardly from said body and adapted to receive the free end of said bit, a retaining band secured to the back of said body in vertical spaced relation to said socket and adapted to encircle said bit, a flat depressible spring lip on the body at its upper edge midway the length thereof and extending rearwardly at an upward incline above said retaining band, and an opening in said lip and shaped to conform to the transverse cross section of said bit and of a slightly larger dimension than said bit, whereby the upward tension of said lip is adapted to bind said bit in said opening and preclude accidental upward movement of the bit out of the socket and retaining band.

GEORGE L. SAUNDERS.

References Cited in the file of this patent

UNITED STATES PATENTS

| Number | Name | Date |
|---|---|---|
| 1,008,873 | Stults | Nov. 14, 1911 |
| 1,018,518 | Petit | Feb. 27, 1912 |
| 1,175,192 | Tankersley | Mar. 14, 1916 |
| 1,232,361 | Mills | July 3, 1917 |
| 2,254,586 | Warwick | Sept. 2, 1941 |

FOREIGN PATENTS

| Number | Country | Date |
|---|---|---|
| 13,103 | Great Britain | May 30, 1910 |
| 34,770 | Switzerland | Mar. 7, 1906 |
| 36,598 | Sweden | Apr. 29, 1914 |